United States Patent [19]

Jennings, Jr.

[11] Patent Number: 5,415,227
[45] Date of Patent: * May 16, 1995

[54] METHOD FOR WELL COMPLETIONS IN HORIZONTAL WELLBORES IN LOOSELY CONSOLIDATED FORMATIONS

[75] Inventor: Alfred R. Jennings, Jr., Plano, Tex.

[73] Assignee: Mobil Oil Corporation, Fairfax, Va.

[*] Notice: The portion of the term of this patent subsequent to Jul. 13, 2010 has been disclaimed.

[21] Appl. No.: 151,661

[22] Filed: Nov. 15, 1993

[51] Int. Cl.⁶ .................... E21B 43/08; E21B 43/10
[52] U.S. Cl. ........................... 166/278; 166/50; 166/236
[58] Field of Search ............... 166/50, 227, 228, 236, 166/265, 278

[56] References Cited

U.S. PATENT DOCUMENTS

| | | | |
|---|---|---|---|
| 2,696,264 | 12/1954 | Colmerauer et al. | 166/50 X |
| 4,332,295 | 6/1982 | LaHaye et al. | 165/178 |
| 4,532,994 | 8/1985 | Toma et al. | 166/50 X |
| 4,703,799 | 11/1987 | Jennings, Jr. et al. | 166/276 |
| 4,811,790 | 3/1989 | Jennings, Jr. et al. | 166/278 |
| 4,953,619 | 9/1990 | Dullien et al. | 166/50 X |
| 5,107,297 | 4/1992 | Whiteley et al. | 166/50 |
| 5,131,472 | 7/1992 | Dees et al. | 166/50 X |
| 5,167,280 | 12/1992 | Sanchez et al. | 166/267 |
| 5,226,495 | 7/1993 | Jennings, Jr. | 166/278 |
| 5,240,074 | 8/1993 | Peavy et al. | 166/286 |

*Primary Examiner*—George A. Suchfield
*Attorney, Agent, or Firm*—Alexander J. McKillop; George W. Hager, Jr.; Charles A. Malone

[57] ABSTRACT

A method for completing a horizontal wellbore in a loosely consolidated or unconsolidated formation. To minimize collapse of the wellbore and minimize sand production while providing for greater flexibility in the placement of a sand control device in a horizontal wellbore, a slotted liner with a flexible sand control device affixed thereto is positioned into the horizontal wellbore. After positioning, the liner with sand control device attached, high permeability of openings within the liner is maintained when producing hydrocarbonaceous fluids from the formation.

5 Claims, 1 Drawing Sheet

METHOD FOR WELL COMPLETIONS IN HORIZONTAL WELLBORES IN LOOSELY CONSOLIDATED FORMATIONS

FILED OF THE INVENTION

This invention relates to a sand control method for completing wells in poorly consolidated or unconsolidated formations where a slotted liner is utilized.

BACKGROUND OF THE INVENTION

In completing wells in poorly consolidated or unconsolidated formations, consideration must be given to sand problems likely to arise during the operation of the well. The incompetent nature of this type of formation requires that a well completion technique include means for excluding sand production. Erosion and plugging effects of sand entrained in produced fluids are well known and if not arrested can seriously reduce well productivity.

The propensity of a formation to produce sand is particularly acute in formations characterized as unconsolidated or poorly consolidated. These terms, as applied to subterranean sedimentary deposits, define a particular class of sedimentary rock, the distinguishing characteristics of which is the absence of a rock matrix made up of sand grains bound into a cohesive mass.

When completing wells in an unconsolidated or poorly consolidated formation, success of in-casing gravel packs using a slotted liner in a perforated casing is highly dependent on established gravel/formation fine size relationships. With study and experience, it is possible to select the proper gravel size to optimize productivity while controlling formation fines invasion into the wellbore. Success of the gravel pack is very dependent on effective placement of the gravel. Ordinarily, this can be successfully accomplished in a vertical wellbore.

Most loosely consolidated formations where fines production is likely to occur are located offshore where many wells are drilled from a single platform. Most wells are drilled on an incline, resulting in completions through the pay intervals at an angle. In these wells, it is more difficult to place a gravel pack effectively due to the inclination of the hole. Because of the inclination of inclined or deviated wellbores, conventional gravel packing procedures meet with limited success in these wells.

As mentioned in industry literature (SPE 24842 "Completion Techniques Used in Horizontal Wells Drilled in Shallow Gas Sands in the Gulf of Mexico" by C. W. Pardo and A. N. Patricks, Texaco, Inc., presented at the 67 th Annual Technical Conference and Exhibition of the SPE in Washington, D.C., Oct. 4–7, 1992), horizontal well completions in horizontal, loosely consolidated wellbores is difficult. In this presentation, it was proposed to use pre-packed screens in slotted liners to minimize sand production. As proposed, this technique is limited in that the pre-packed screens are of rigid construction and the materials in the pre-packs are highly susceptible to damage by acids used for stimulating sandstone formations.

Therefore, what is needed is a method for a horizontal well completion whereby a horizontal wellbore in a loosely consolidated or unconsolidated formation is completed with a slotted liner which minimizes wellbore collapse and a flexible sand control device that facilitates positioning while minimizing sand production.

SUMMARY OF THE INVENTION

This invention is directed to a method for completing a horizontal well located in a loosely consolidated or unconsolidated formation. Initially, a slotted liner having one closed and one open end is positioned within a horizontal wellbore located in said formation. Its upper open end is penetrated by and encloses a production tube or tubing. Its upper end is held in place within the wellbore by a circumferential packer. The lower end of the production tubing is fluidly connected to at least one fused refractory section having sufficient porosity to remove fines from hydrocarbonaceous fluids flowing through the slotted liner which are subsequently produced to the surface. When two or more refractory sections are utilized, a flexible open ended section is interconnected between these sections to provide flexibility when positioning the sections through the horizontal wellbore. Use of the slotted liner prevents the loosely consolidated or unconsolidated formation from collapsing the wellbore while the porous section allows acidizing of the formation as well as fines removal from the porous section by strong mineral acids.

It is therefore an object of this invention to provide for a fused refractory system which can be made of a porosity sufficient to exclude formation fines regardless of the size of said fines while the wellbore is prevented from collapsing via the slotted liner.

It is another object of this invention to provide for a fused refractory section through which workover fluids and acids can be pumped to clean out said section without removing said section from the wellbore while preventing borehole collapse with the slotted liner.

It is a further object of this invention to provide for a fused refractory section which is suitable for use in a steam flood operation while preventing borehole collapse in a loosely consolidated formation via a slotted liner.

These and other objects of this invention will become apparent from the following detailed description together with the accompanying exemplary drawings.

DESCRIPTION OF THE PREFERRED EMBODIMENTS

Figure 2:
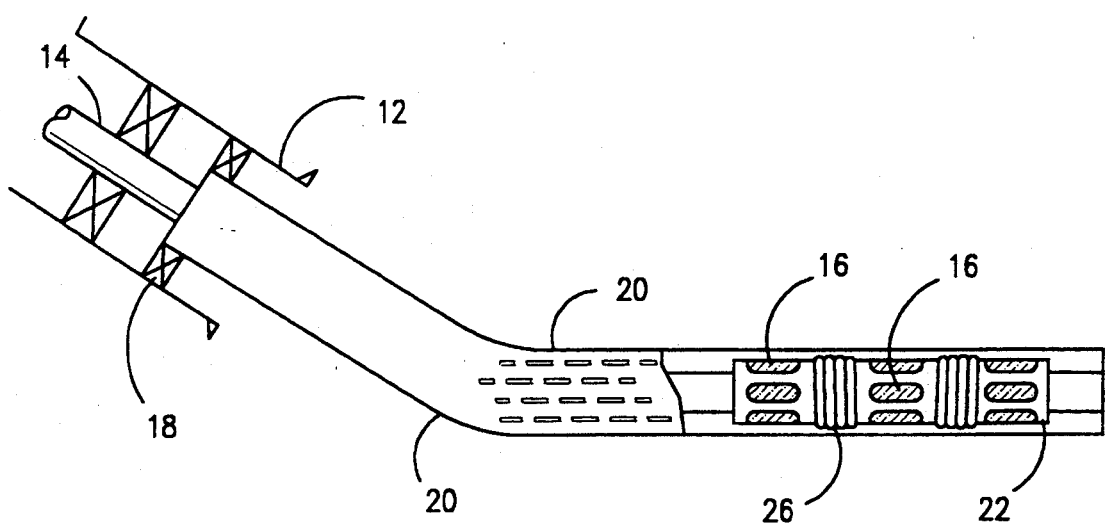
FIG. 2 is a side view of the slotted liner positioned within the casing while the fused refractory sections with flexible sections therebetween are fluidly connected to a production tube which produces hydrocarbonaceous fluids to the surface.

In the practice of this invention referring to FIG. 2, a slotted liner 20 is directed into a horizontal borehole. The slotted liner 20 has one closed end and one open end. The closed end is at the lower end of the horizontal wellbore. Its upper end is held securely in wellbore 12 by a circumferential packer 18. The slotted liner has a production tube or tubing 14 penetrating through its upper most end where it proceeds into the slotted liner itself. The opposite end of production tube 14 removes hydrocarbonaceous fluids from a loosely consolidated formation to the surface. The lower end of production tube 14 which is located within slotted liner 20 is fluidly connected to at least one fused refractory section 16. When more than one refractory section is utilized in liner 20, they are interconnected with a flexible open ended tubing 26, preferably "COFLEXIP" tubing which can be purchased from Coflexip and Services, Inc., 7660 Woodway Suite 390, Houston, Tex. 77063.

The term "horizontal well" is used for any well in which the maximum angle from vertical of any segment of the wellbore is greater than about 70°. Such horizonal wells are often completed with slotted liners in the productive zone of a formation. Horizontal wells are discussed in U.S. Pat. Nos. 5,240,074, 4,703,799 and 5,167,280. These patents issued to Peavy et al. on Aug. 3, 1993; Jennings, Jr. et al. on Nov. 3, 1987; and Sanchez et al. on Dec. 1, 1992, respectively. These patents are hereby incorporated by reference herein.

Figure 1:
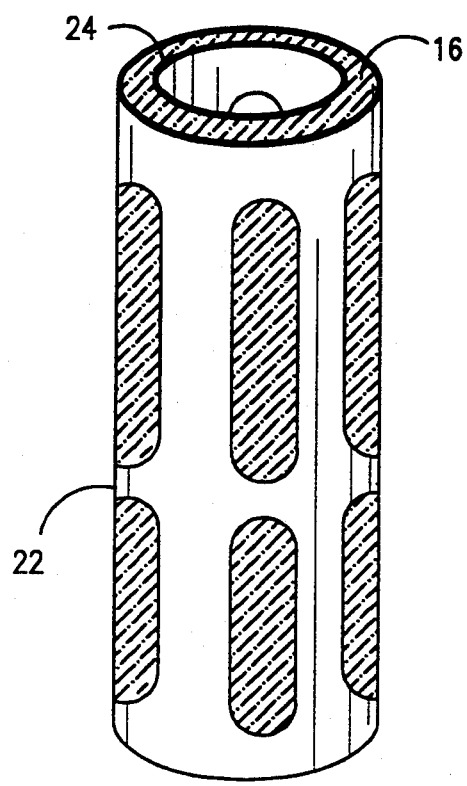
FIG. 1 is an exposed view of the fused refractory core or tube within the retainer which has internal and external sheaths or walls.

As is shown in FIG. 1, a fused refractory section 16, preferably comprised of silicon carbide, is enclosed by outer wall 22 which has perforations therein, which outer wall is fittingly adapted onto production tube assembly 14. Said assembly 14 is positioned in the horizontal wellbore so that fused refractory section 16 contained in said outer wall 22 is adjacent to slots contained in solid liner 20. When the horizontal well is produced, hydrocarbonaceous fluids leave the productive interval via slots in slotted liner 20. They proceed through the inner fused refractory section 16 via openings contained in outer wall 22 where formation fines entrained in hydrocarbonaceous fluids are removed. These fines are removed because pores in section 16 are smaller than the entrained fines in the hydrocarbonaceous fluid. Methods for making refractory section 16 as well as outer wall 22 and inner wall 24 are disclosed in U.S. Pat. No. 4,811,790 which issued to Jennings, Jr. et al. on Mar. 14, 1989. This patent is hereby incorporated by reference herein.

Section 16 is comprised of material to make it resistant to thermal shock and also resistant chemical attack at high temperatures. Alloys of silicon carbide, silicon nitride, or other similar ceramics can be used to construct fused refractory section 16. U.S. Pat. No. 4,332,295 which issued to LaHaye et al. discloses other ceramic compositions which can be used in constructing section 16. This patent is hereby incorporated by reference herein.

Fused refractory section 16 can be made sufficiently porous to admit hydrocarbonaceous fluids while excluding formation fines. The desired porosity can be obtained by varying the density of the ceramic material utilized. Also the size, shape, diameter, chemical resistance, and thermal resistance can be modified to conform to dictates of the particular formation where utilized. As is preferred, said refractory section 16 should have a wall thickness of about 5 about 40 millimeters and of a thickness sufficient to withstand pressure of from about 1,000 to about 15,000 psig.

Porous refractory section 16 is positioned and fittingly adapted to be affixed to production tube 14 via a cylindrically shaped retainer. This retainer, as it is shown in FIG. 1, has one closed end and one open end. When more than 2 refractory sections are utilized, a flexible open end tubing sufficient to withstand environmental conditions in the formation are interconnected between the sections so as to cause fluid communication therethrough. Outer wall 22 has openings therein which allow fluid communications with refractory tube 16. Open ended refractory tube 16 is formed to be of a size sufficient to fit within the space provided for by inner wall 24 or outer wall or sheath 22. These walls, 22 and 24, at the open end of the retainer are fittingly adopted to be connected to the production tube 14. When the refractory tube or tubes are positioned within said walls, these walls protect them from shock and facilitate removal of the tubes from the slotted liner. The preferred method of affixing said retainer to one end of production tube 14 is by screwing it on thereby causing it and said tube to fluidly communicate with a productive interval and the surface.

The retainer is preferably made of a metal sufficient to withstand high temperatures, pressures and low pH conditions encountered during enhanced oil recovery operations. Although metal is preferred, the said retainer can be made of a thermosettable polymer sufficient to withstand said conditions encountered during enhanced oil recovery operations. Said thermosettable polymers include "BAKE-LITE", epoxy resins, and certain phenolic resins. Because the fused refractory section or sections and the retainer, along with the flexible tubing, are made of acid resistant materials, the formation or productive interval thereof can be acidized to increase the permeability of the loosely consolidated formation. Also, when formation fines have reduced the efficiency of the fused refractory sections, mineral acids such as hydrochloric acid can be directed through the refractory sections to remove these fines and thereby increase the flow of hydrocarbons from the productive interval to the surface. Thus, while substantially fines free hydrocarbonaceous fluids are being produced from the productive interval of the formation, the horizontal borehole is prevented from collapsing onto the fused refractory sections via the slotted liner.

Obviously, many other variations and modifications of this invention, as previously set forth, may be made without departing from the spirit and scope of this invention as those skilled in art readily understand. Such variations and modifications are considered part of this invention and within the purview and scope of the appended claims.

I claim:

1. A method for completing a horizontal well in a loosely consolidated or unconsolidated formation comprising:

a) positioning a slotted liner having one closed and one open end within a horizontal wellbore so as to cause the open end of said liner to be affixed to a lower end of a casing within the wellbore thereby fluidly communicating said liner and casing with the formation and surface; and b) directing a flexible sand control device into said liner thereby causing a closed end of said device to be positioned adjacent to the liner's closed end while the device's open end is fluidly connected to a lower end of a production tube for producing substantially sand free hydrocarbonaceous fluids to the surface as the slotted liner prevents the formation from collapsing into the wellbore.

2. The method as recited in claim 1 where the sand control device contains at least two porous refractory sections separated by a flexible section.

3. The method as recited in claim 1 where the formation comprises a loosely consolidated sandstone formation.

4. The method as recited in claim 1 where after step b) an acid is flowed through said device and liner which acid is of a strength and composition sufficient to remove formation fines from said device and liner as required.

5. The method as recited in claim 1 where after step b) the formation is acidized by flowing an acid through said device and liner.

* * * * *